US012683664B2

(12) United States Patent　　(10) Patent No.: US 12,683,664 B2
Kyung et al.　　(45) Date of Patent: Jul. 14, 2026

(54) METHOD AND APPARATUS FOR MIMO CSI FEEDBACK

(71) Applicant: MediaTek Singapore Pte. Ltd., Singapore (SG)

(72) Inventors: Gyu Bum Kyung, San Jose, CA (US); Jiann-Ching Guey, Hsinchu City (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 347 days.

(21) Appl. No.: 18/688,904

(22) PCT Filed: Aug. 25, 2022

(86) PCT No.: PCT/CN2022/114796
§ 371 (c)(1),
(2) Date: Mar. 4, 2024

(87) PCT Pub. No.: WO2023/040618
PCT Pub. Date: Mar. 23, 2023

(65) Prior Publication Data
US 2025/0132800 A1　　Apr. 24, 2025

Related U.S. Application Data

(60) Provisional application No. 63/244,295, filed on Sep. 15, 2021.

(51) Int. Cl.
*H04B 7/06* (2006.01)
*H04L 5/00* (2006.01)

(52) U.S. Cl.
CPC ........... *H04B 7/0626* (2013.01); *H04B 7/063* (2013.01); *H04L 5/0048* (2013.01)

(58) Field of Classification Search
CPC ..... H04B 7/0626; H04B 7/063; H04L 5/0048; H04L 25/0204; H04L 25/021; H04L 25/0224
See application file for complete search history.

(56) References Cited

U.S. PATENT DOCUMENTS

| | | | | |
|---|---|---|---|---|
| 11,005,629 B2 * | 5/2021 | Park | ...................... | H04L 5/0051 |
| 11,876,589 B2 * | 1/2024 | Ramireddy | ......... | H04L 25/0224 |

(Continued)

FOREIGN PATENT DOCUMENTS

| | | |
|---|---|---|
| CN | 112514334 A | 3/2021 |
| CN | 113381950 A | 9/2021 |

(Continued)

OTHER PUBLICATIONS

International Search Report dated Nov. 30, 2022, issued in application No. PCT/CN2022/114796.

(Continued)

*Primary Examiner* — Hashim S Bhatti
(74) *Attorney, Agent, or Firm* — McClure, Qualey & Rodack, LLP

(57) ABSTRACT
A user equipment (UE) reports channel state information (CSI) to a base station in multiple-input multiple-output (MIMO) transmissions. The UE constructs a CSI matrix based on a CSI reference signal (CSI-RS) received from the base station. The CSI matrix is at least three-dimensional in a transmit (Tx) antenna domain, a frequency domain, and a time domain. The UE transforms the CSI matrix into a transformed matrix in at least a Tx beam domain, a delay domain, and a Doppler domain. The UE encodes the transformed CSI matrix into a one-dimensional feature vector using a multi-layered neural network, and sends the one-dimensional feature vector to the base station.

20 Claims, 6 Drawing Sheets

(56) References Cited

U.S. PATENT DOCUMENTS

| 12,407,379 | B2 * | 9/2025 | Manolakos | .......... | H04B 7/0663 |
| 2022/0094411 | A1 * | 3/2022 | Yoo | ...................... | G06N 3/0455 |
| 2024/0030980 | A1 * | 1/2024 | Wang | ................... | G06N 3/0455 |

FOREIGN PATENT DOCUMENTS

| WO | 2018/143688 | A1 | 8/2018 |
| WO | 2019/229152 | A1 | 12/2019 |
| WO | 2020/150860 | A1 | 7/2020 |

OTHER PUBLICATIONS

Chinese language office action dated Aug. 9, 2023, issued in application No. TW 111134682.

* cited by examiner

Process 100

BS 120

UE 150

Transmit CSI-RS (101)

Construct a CSI matrix H1 (102)

Apply DFT to H1 to generate H̄1 (103)

Apply DNN1 to H̄1 to generate 1D feature vector (104)

Transmit 1D feature vector (105)

Apply DNN2 to 1D feature vector to generate a matrix H̄2 (106)

Apply IDFT to H̄2 to generate a reconstructed CSI matrix H2 (107)

Precode DL transmission (108)

Transmit precoded DL control and data signals (109)

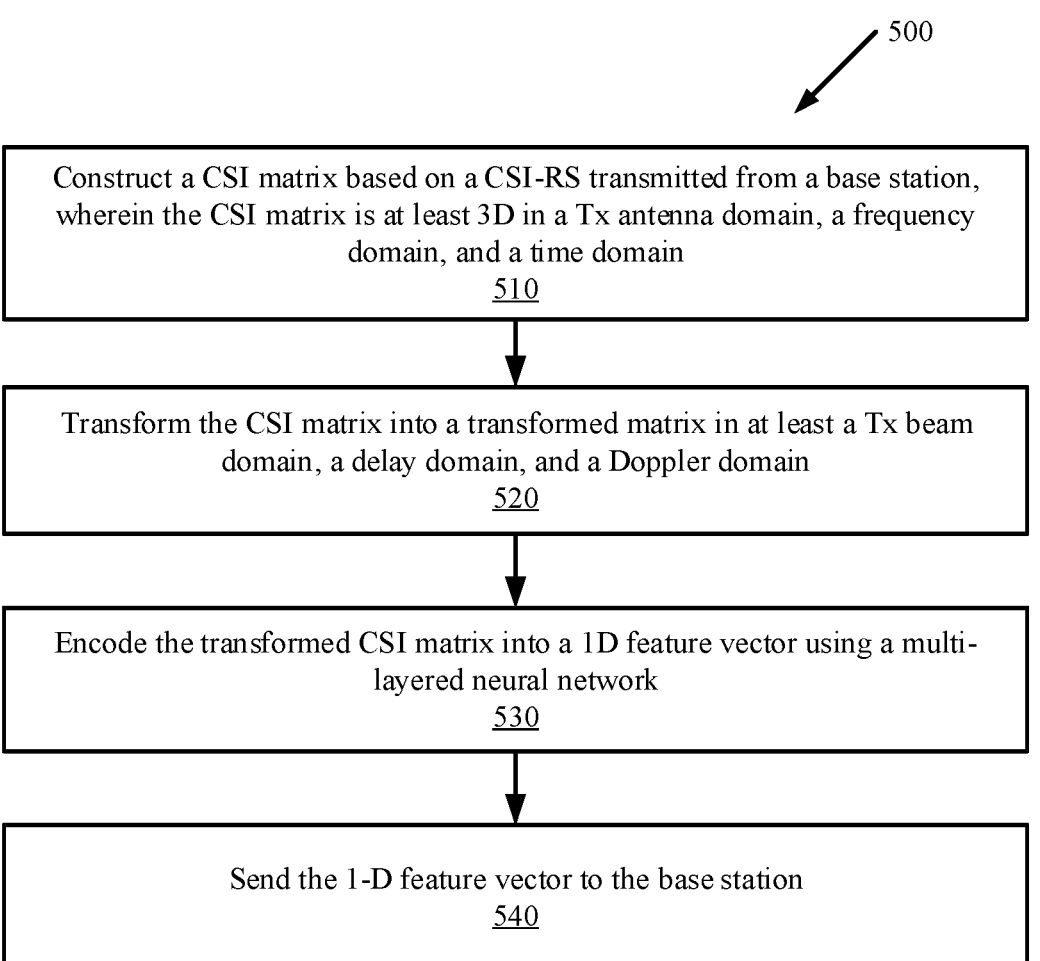

500

Construct a CSI matrix based on a CSI-RS transmitted from a base station, wherein the CSI matrix is at least 3D in a Tx antenna domain, a frequency domain, and a time domain
510

Transform the CSI matrix into a transformed matrix in at least a Tx beam domain, a delay domain, and a Doppler domain
520

Encode the transformed CSI matrix into a 1D feature vector using a multi-layered neural network
530

Send the 1-D feature vector to the base station
540

Receive a 1D feature vector from a UE
610

Decode the 1D feature vector into a matrix of at least 3D in a Tx beam domain, a delay domain, and a Doppler domain using a multi-layered neural network
620

Transform the matrix into a CSI matrix in at least a Tx antenna domain, a frequency domain, and a time domain
630

Precode downlink transmission based on the CSI matrix
640

METHOD AND APPARATUS FOR MIMO CSI FEEDBACK

CROSS-REFERENCE TO RELATED APPLICATIONS

This application claims the benefit of U.S. Provisional Application No. 63/244,295 filed Sep. 15, 2021, the entirety of both of which is incorporated by reference herein.

TECHNICAL FIELD

Embodiments of the invention relate to wireless communications; more specifically, to transmission of channel state information (CSI) feedback.

BACKGROUND

The Fifth Generation New Radio (5G NR) is a telecommunication standard for mobile broadband communications. NR is promulgated by the 3rd Generation Partnership Project (3GPP) to significantly improve performance metrics such as latency, reliability, throughput, etc. Furthermore, NR supports beamforming, multiple-input multiple-output (MIMO) antenna technology, and carrier aggregation.

In a 5G NR network, a base station can transmit one or more reference signals, including a channel state information reference signal (CSI-RS), to a user equipment (UE). Based on measurements of the CSI-RS, the UE can, for example, estimate downlink channel quality and obtain spatial information in the downlink transmission. The UE reports the estimated channel quality to the base station, and the base station transmits precoded downlink signals based on the report from the UE. The base station can also adapt the downlink data rate and modulation scheme based on the UE's report.

The UE's report to the base station in MIMO transmissions can create a large overhead, often prohibitively large for limited bandwidth in a typical wireless system. Thus, the existing 5G NR technology can be further improved to benefit operators and users. These improvements may also apply to other multi-access technologies and the telecommunication standards that employ these technologies.

SUMMARY

In one embodiment, a method is provided for a UE to report channel state information (CSI) to a base station in multiple-input multiple-output (MIMO) transmissions. The method comprises constructing a CSI matrix based on a CSI reference signal (CSI-RS) received from the base station. The CSI matrix is at least three-dimensional in a transmit (Tx) antenna domain, a frequency domain, and a time domain. The method further comprises transforming the CSI matrix into a transformed matrix in at least a Tx beam domain, a delay domain, and a Doppler domain; encoding the transformed CSI matrix into a one-dimensional feature vector using a multi-layered neural network; and sending the one-dimensional feature vector to the base station.

In another embodiment, a method is provided for a base station to obtain CSI from a UE in MIMO transmissions. The method comprises receiving a one-dimensional feature vector from the UE, and decoding the one-dimensional feature vector into a matrix of at least three-dimensional in a Tx beam domain, a delay domain, and a Doppler domain using a multi-layered neural network. The method further comprises transforming the matrix into a CSI matrix in at least a Tx antenna domain, a frequency domain, and a time domain, and precoding downlink transmission based on the CSI matrix.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 5 is a flow diagram illustrating a method performed by a UE according to one embodiment.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a user equipment (UE) and a base station with neural networks to reduce the overhead in the transmission of channel state information (CSI). Both the UE and the base station support multiple-input multiple-output (MIMO) transmissions. The UE uses a first neural network to compress a matrix representation of the CSI into a one-dimensional (1D) feature vector, and the base station uses another neural network to reconstruct the CSI from the 1D feature vector. In one embodiment, the CSI includes channel information in the time, frequency, and spatial domains. The first neural network serves as an encoder, and the second neural network serves as a decoder. In the following disclosure, the terms "compress" and "encode" are used interchangeably, and the terms "decompress" and "decode" are used interchangeably. The UE reports downlink CSI to the base station by transmitting the ID feature vector, and the base station reconstructs the CSI from the ID feature vector.

The deep learning approach to CSI compression can significantly increase downlink throughput in massive MIMO systems. These massive MIMO systems generally have a serious overhead in downlink CSI feedback due to a large number of antennas at the base station. Compared with existing sensing-based CSI compression, the deep learning approach described herein provides better reconstruction performance in terms of the mean squared error (MSE) at the base station. Furthermore, the deep learning approach described herein fully utilizes the correlation in all physical domains (i.e. antennas, time, and frequency) and can achieve a better estimate of channel conditions compared with existing methods.

The disclosed method, as well as the apparatus and the computer product implementing the method, can be applied to wireless communication between a base station (e.g., a gNB in a 5G NR network) and UEs. It is noted that while the embodiments may be described herein using terminology commonly associated with 5G or NR wireless technologies, the present disclosure can be applied to other multi-access technologies and the telecommunication standards that employ these technologies, such as Long Term Evolution (LTE) systems, future 3GPP systems, IEEE protocols, and the like.

Figure 1:
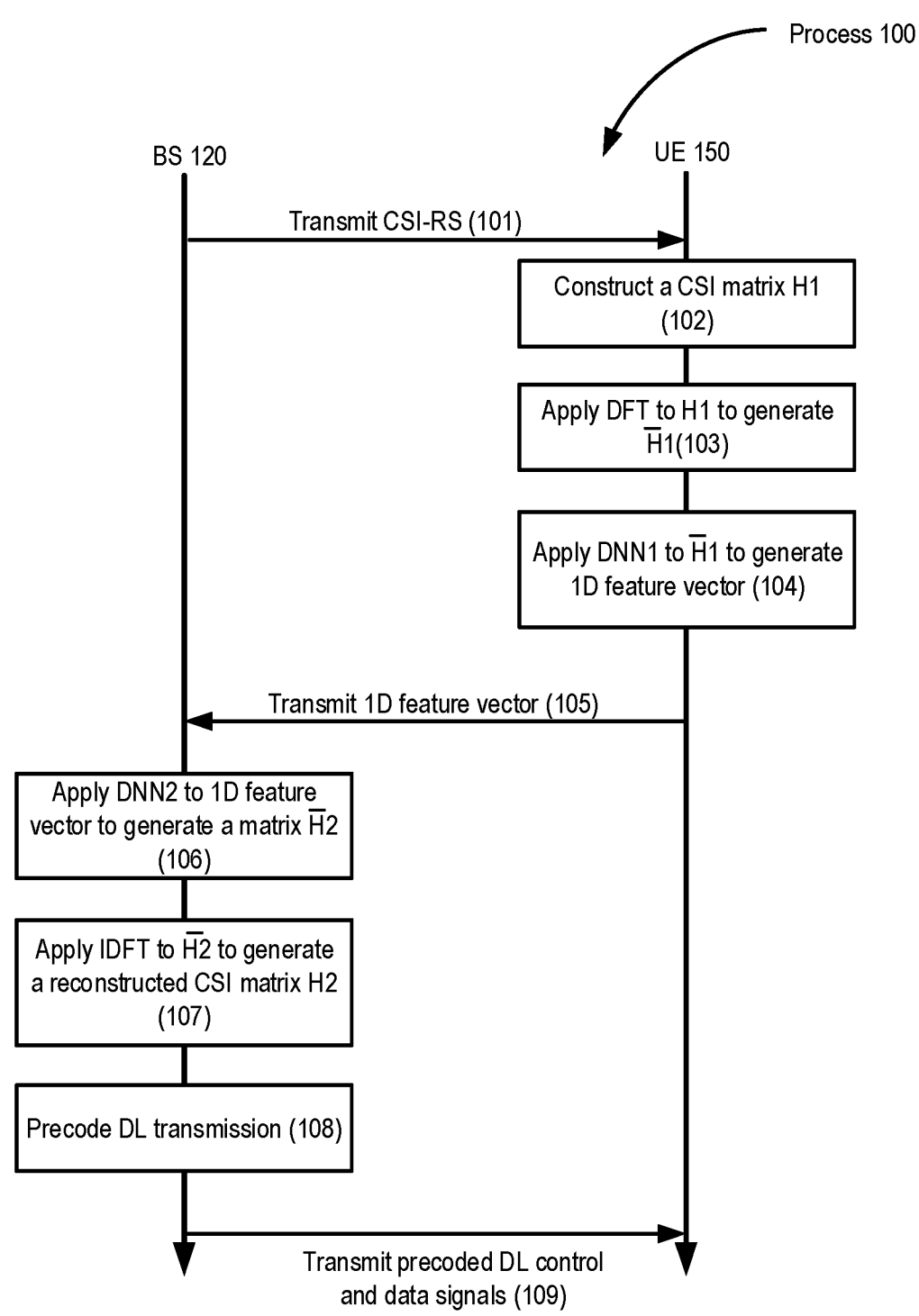
FIG. 1 is a diagram illustrating a process for CSI compression and reconstruction according to one embodiment.

FIG. 1 is a diagram illustrating a process 100 for CSI compression and reconstruction according to one embodiment. In some network environments such as a 5G NR network, a base station (BS) 120 may be known as a gNodeB, a gNB, and/or the like. In an alternative network environment, a base station may be known by other names. The BS 120 and a UE 150 transmit beamformed signals to each other.

The UE 150 may also be known by other names, such as a mobile station, a subscriber unit, and/or the like. The UE 150 may be stationary or mobile. Examples of the UE 150 may include a cellular phone (e.g., a smartphone), a wireless communication device, a handheld device, a laptop computer, a tablet, a gaming device, a wearable device, an entertainment device, a sensor, a vehicle, an infotainment device, Internet-of-Things (IoT) devices, or any device that can communicate via a wireless medium. The UE 150 can be configured to receive and transmit signals over an air interface to one or more cells in a radio access network.

In one embodiment, both the BS 120 and the UE 150 support MIMO transmissions. For MIMO transmissions, a transmitter may utilize multiple transmit (Tx) antennas for data transmission to a receiver equipped with multiple receive (Rx) antennas. In one embodiment, both the BS 120 and the UE 150 include MIMO antennas for performing beam steering and tracking in both Tx and Rx directions. The BS 120 forms multiple beams for downlink transmission and uplink reception, and the UE 150 also forms beams for uplink transmission and downlink reception. Each beam corresponds to a spatial relation between the BS 120 and the UE 150. To the UE 150, a spatial relation is equivalent to spatial filtering that the UE 150 can apply in the analog and/or digital domain.

The BS 120 transmits downlink reference signals to the UE 150 or a group of UEs in a serving cell. One of the reference signals is a channel state information reference signal (CSI-RS). The BS 120 can configure a set of time-and-frequency resources for a CSI-RS configuration used by the UE 150. According to the CSI-RS configuration, the UE 150 receives a CSI-RS with the given time-and-frequency resources for channel quality estimation, frequency, and time tracking, among other uses. A CSI-RS may be periodic, aperiodic, or semi-persistent. Based on the CSI-RS, the UE calculates a channel matrix and reports a representation of the channel matrix to the base station. The term "channel matrix" herein referred to a matrix H that models the relationship between the downlink signal(s) transmitted from the base station and the signal (r) received by the UE. A simplified form of this relationship can be expressed as:

$$r = H \cdot s + n, \text{ where } n \text{ is a noise signal.}$$

Referring to process 100 in FIG. 1, the BS 120 at step 101 transmits a CSI-RS to the UE 150. Based on the received CSI-RS, the UE 150 estimates downlink channel quality and constructs a matrix representation of CSI at step 102. The matrix representation (H1) is herein referred to as a CSI matrix. A CSI matrix can be a channel matrix, a covariance of the channel matrix, an orthogonal matrix obtained from the singular value decomposition (SVD) of the channel matrix, or another matrix calculated from the channel matrix. At step 103, the UE 150 applies a Discrete Fourier Transform (DFT) to the CSI matrix to generate a transformed CSI matrix ($\bar{H}1$). The DFT has the effect of reducing the non-zero elements in the CSI matrix. At step 104, the UE 150 applies a first deep neural network (DNN1) to the transformed CSI matrix to obtain a ID feature vector. The feature vector is also referred to as a compressed vector, because the number of elements in the features vector is fewer than the total number of elements in the transformed CSI matrix. At step 105, the UE 150 transmits the feature vector to the BS 120.

The BS 120 applies a DNN (e.g., DNN2) to the feature vector at step 106 to generate a matrix ($\bar{H}2$), and then applies an inverse DFT (IDFT) to $\bar{H}2$ at step 107 to generate a reconstructed CSI matrix (H2). The reconstructed CSI matrix indicates the quality of the radio channel or link between the BS 120 and the UE 120. Based on the reconstructed CSI matrix, the BS 120 at step 108 determines a MIMO precoding scheme, the number of UE-preferred transmission layers for downlink transmission, and precodes the downlink signals accordingly. At step 109, the BS 120 transmits precoded downlink signals to the UE 150.

Figure 2:
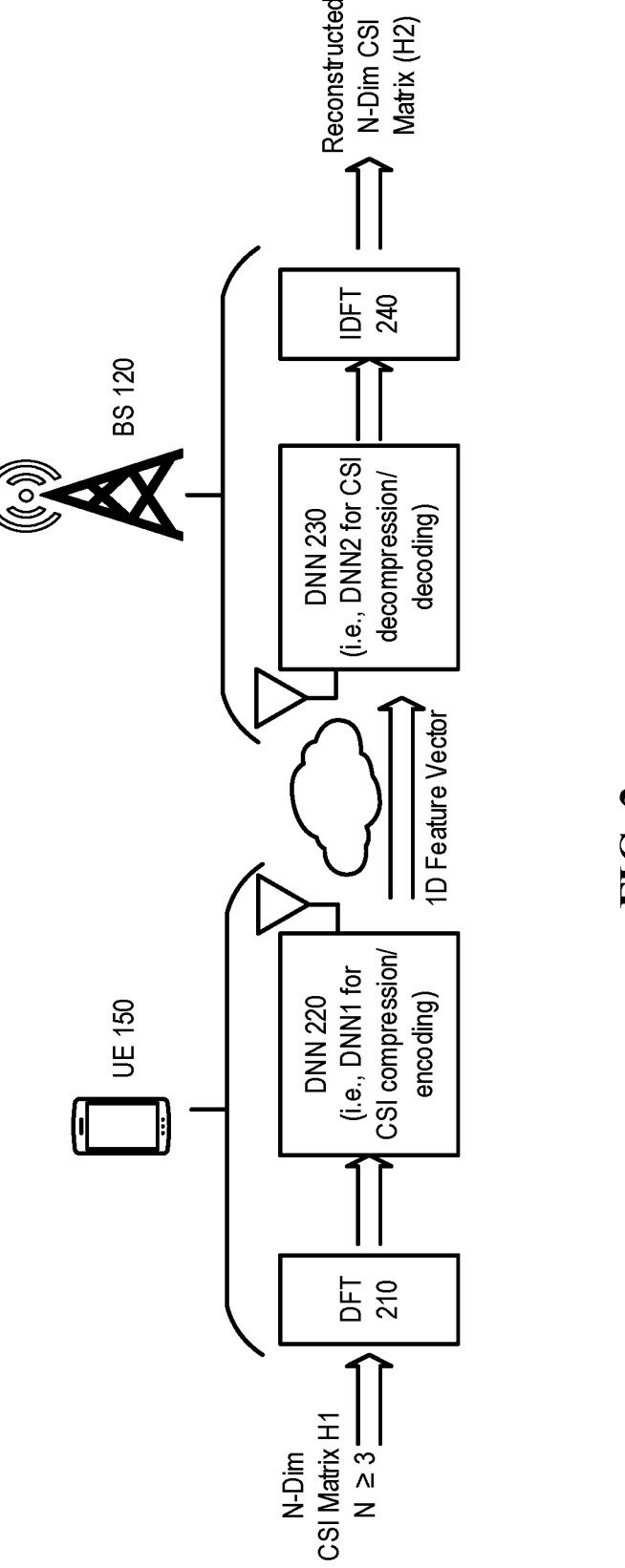
FIG. 2 is a diagram illustrating the operations performed by a UE and a base station, respectively, according to one embodiment.

FIG. 2 is a diagram illustrating the operations performed by a UE and a base station, respectively, according to one embodiment. An $n_R \times n_T$ MIMO channel in an orthogonal frequency-division multiplexing (OFDM) system can be expressed as a four-dimensional (4D) channel matrix:

$$H[n, m] = \begin{bmatrix} h_{11}[n, m] & \cdots & h_{1n_T}[n, m] \\ \vdots & \ddots & \vdots \\ h_{n_R 1}[n, m] & \cdots & h_{n_R n_T}[n, m] \end{bmatrix},$$

where $n_R$ is the number of Rx antennas at the UE, $n_T$ is the number of Tx antennas at the base station, n is the time domain index in the unit of OFDM symbols or slots, and m is the frequency domain index in the unit of subcarriers or subbands.

When $n_R=1$, the MIMO channel can be expressed as a three-dimensional (3D) channel matrix in the Tx antennas, time, and frequency domains as follows.

$$H_{3D} = \{h[i, n, m] : 1 \le i \le n_T, \ 1 \le n \le N, \ 1 \le m \le M\},$$

where N is the total number of OFDM symbols or slots, and M is the total number of subcarriers or subbands.

$H_{3D}$ can be transformed to $\overline{H}_{3D}$ in the beam, delay, and Doppler domains by 3D-DFT.

$$\overline{H}_{3D} = 3D - DFT \, (H_{3D}) = \{\overline{h}[j, k, l] : 1 \le j \le n_T, \; 1 \le k \le N, \; 1 \le l \le M\},$$

where j is the beam index, k is the index of Doppler components, and l is the index of delay components. The UE applies DNN1 to $\overline{H}_{3D}$ to generate a ID feature vector hv. In the description herein, the MIMO channel matrix is at least 3D in the Tx antenna domain, the frequency domain, and the time domain.

Referring to FIG. 2, the UE 150 applies DFT 210 and DNN 220 to the MIMO channel matrix (H) to generate a ID feature vector. In alternative embodiments, the UE may apply DFT 210 and DNN 220 to the covariance C=H·H$^H$ of the channel matrix H, or an orthogonal matrix V obtained from the SVD of the channel matrix H=USV$^H$, or another matrix calculated from the channel matrix H. The term "CSI matrix" as used herein refers to the MIMO channel matrix H, the covariance matrix C, the orthogonal matrix V, or another matrix calculated from the channel matrix H. The CSI matrix at the UE side is denoted as H1, and the reconstructed CSI matrix at the base station side is denoted as H2.

The UE 150 applies DFT 210 to the CSI matrix H1 to generate a transformed CSI matrix $\overline{H}$1 in at least a Tx beam domain, a delay domain, and a Doppler domain. The UE 150 then uses DNN 220 (i.e., DNN1) to compress $\overline{H}$1 into a ID feature vector hv. The UE 150 then transmits the feature vector hv to the BS 120. The BS 120 uses DNN 230 (i.e., DNN2) to decompress hv into a matrix $\overline{H}$2. The BS 120 then applies IDFT 240 to $\overline{H}$2 to generate a reconstructed CSI matrix H2. It is noted the embodiment of FIG. 2 can be applied to compression and reconstruction of a CSI matrix having dimensions greater than three; e.g., a 4D CSI matrix.

Figures 3, 4:
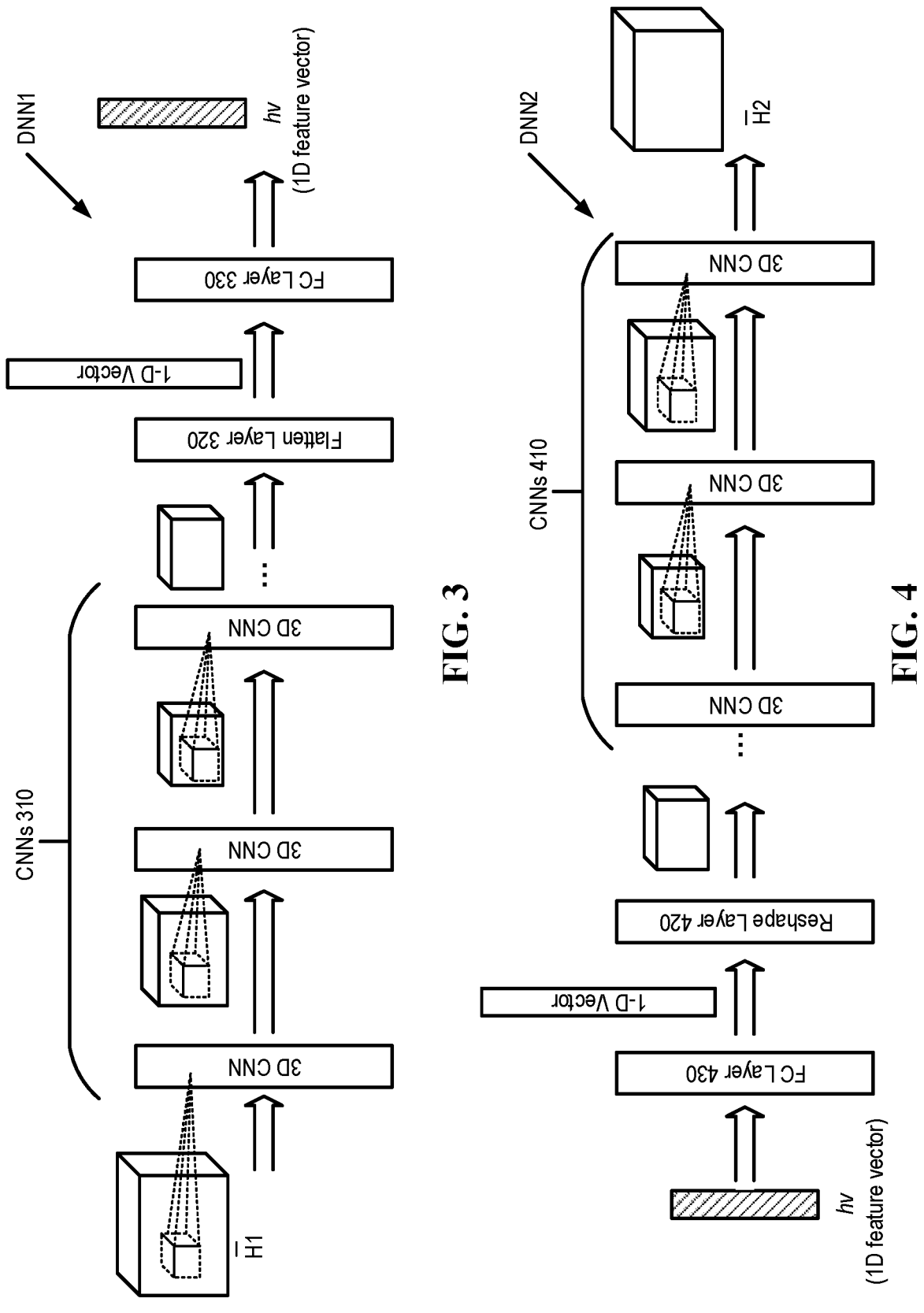
FIG. 3 is a schematic diagram illustrating an example of a deep neural network (DNN) used by a UE according to one embodiment.
FIG. 4 is a schematic diagram illustrating an example of a DNN used by a base station according to one embodiment.

FIG. 3 is a schematic diagram illustrating a DNN used by a UE according to one embodiment. As mentioned before, DNN1 is at the UE side, and the input to DNN1 is the DFT-transformed CSI matrix $\overline{H}$1. In this example, DNN1 includes multiple layers of convolutional neural networks (CNNs) 310. In an embodiment where the CSI matrix is 3D, each CNN 310 applies a 3D kernel to a 3D matrix. In another embodiment where the CSI matrix is 4D, each CNN 310 applies a 4D kernel to a 4D matrix. DNN1 also includes a flatten layer 320 to flatten the multi-dimensional CSI matrix into a ID vector, and a fully-connected (FC) layer 330 to compress the ID vector into a compressed ID vector, also referred to as the feature vector hv. It is understood that DNN1 may include additional layers that are not shown in FIG. 3.

FIG. 4 is a schematic diagram illustrating a DNN used by a base station according to one embodiment. As mentioned before, DNN2 is at the base station side, and the output of DNN2 is a matrix $\overline{H}$2 to be transformed by IDFT into a reconstructed CSI matrix H2. In this example, DNN2 includes an FC layer 430 to decompress the received 1D feature vector hv into an uncompressed 1D vector, and a reshape layer 420 to reshape the ID uncompressed vector into a multi-dimensional matrix. DNN2 also includes multiple layers of CNNs 410. In an embodiment where the CSI matrix is 3D, each CNN 410 applies a 3D kernel to a 3D matrix. In another embodiment where the CSI matrix is 4D, each CNN applies a 4D kernel to a 4D matrix. It is understood that DNN2 may include additional layers that are not shown in FIG. 4. Furthermore, the layered-structures of DNN1 and DNN2 are not necessarily symmetric. For example, the DNN2 may have more, fewer, or different layers than DNN1; the DNN2 may have more, fewer, or different connections between the layers than DNN1.

In one embodiment. DNN1 (the encoder) and DNN2 (the decoder) can be jointly trained by supervised training. That is, training samples are fed into DNN1 and the outputs of DNN2 arc compared against the input training samples. For example, the mean square error (MSE) between DNN1 input and DNN2 output is calculated and is used to update the kernel weights and biases of DNN1 and DNN2. The update may be performed based on a gradient-based method. In one embodiment, the training may be performed jointly by a UE and a base station. In another embodiment, the training may be performed by a computer system (e.g., a server), and the trained DNN1 and DNN2 are downloaded to the UE and the base station, respectively. The training may be performed in multiple operating environments.

FIG. 5 is a flow diagram illustrating a method 500 performed by a UE to report CSI to a base station in MIMO transmissions according to one embodiment. Method 500 begins at step 510 when the UE constructs a CSI matrix based on a CSI-RS from a base station. The CSI matrix is at least 3D in a Tx antenna domain, a frequency domain, and a time domain. The UE at step 520 transforms the CSI matrix (e.g., by DFT) into a transformed matrix in at least a Tx beam domain, a delay domain, and a Doppler domain. The UE at step 530 encodes the transformed CSI matrix into a 1D feature vector using a multi-layered neural network. The UE at step 540 sends the 1D feature vector to the base station.

Figure 6:
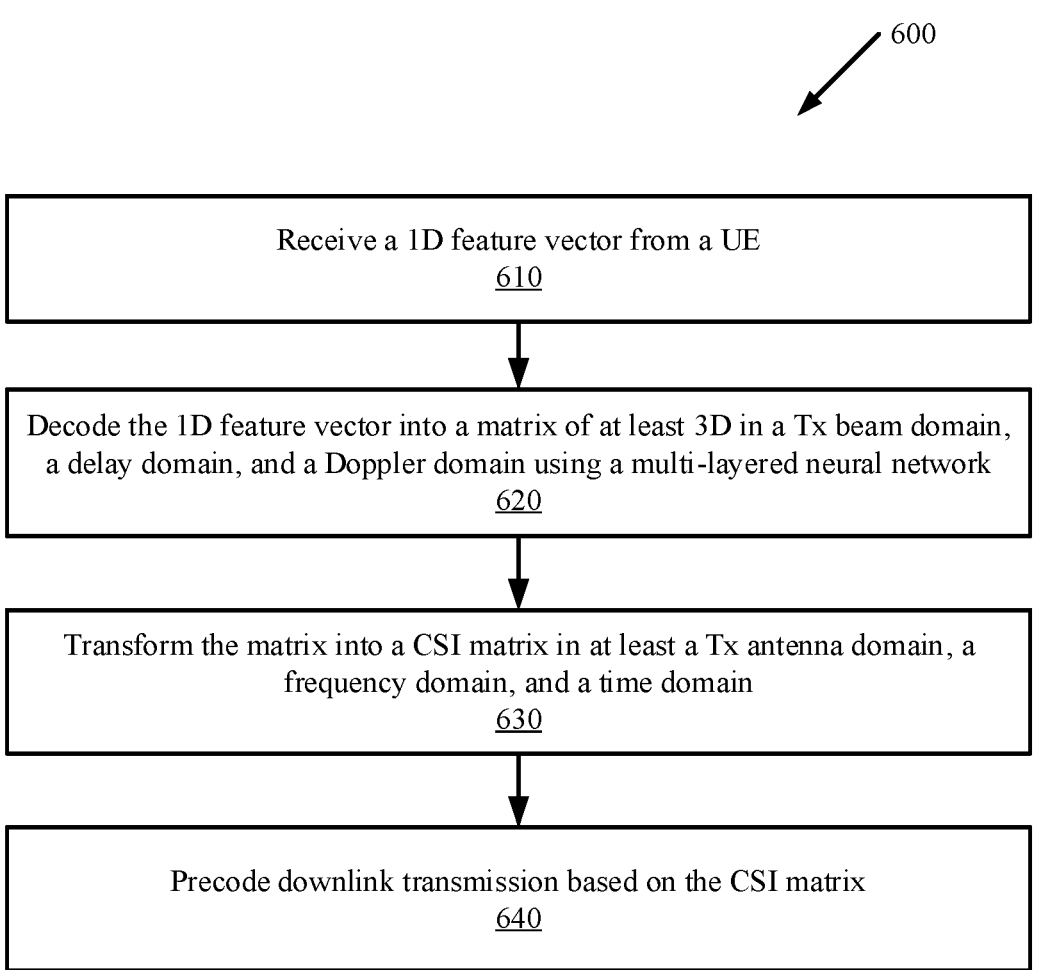
FIG. 6 is a flow diagram illustrating a method performed by a base station according to one embodiment.

FIG. 6 is a flow diagram illustrating a method 600 performed by a base station to obtain CSI from a UE in MIMO transmissions according to one embodiment. Method 600 begins at step 610 when the base station receives a 1D feature vector from a UE. At step 620, the base station decodes the 1D feature vector into a matrix of at least 3D in a Tx beam domain, a delay domain, and a Doppler domain using a multi-layered neural network. At step 630, the base station transforms the matrix (e.g., by IDFT) into a CSI matrix in at least a Tx antenna domain, a frequency domain, and a time domain. At step 640, the base station precodes downlink transmission based on the CSI matrix.

Referring to the embodiment of FIG. 5, the CSI matrix may further include a fourth dimension in an Rx antenna domain which is transformed (e.g., by DFT) into an Rx beam domain. Referring to the embodiment of FIG. 6, the CSI matrix may further include a fourth dimension in an Rx antenna domain which is transformed (e.g., by IDFT) from an Rx beam domain. The Rx antenna domain may be indexed by the number of Rx antennas at the UE. The time domain may be indexed by the number of symbols or slots. The frequency domain may be indexed by the number of subbands or subcarriers. The Tx antenna domain may be indexed by the number of Tx antennas at the base station. The multi-layered neural network may include one or more convolutional neural network layers.

In one embodiment, the CSI matrix is a MIMO channel matrix. In another embodiment, the CSI matrix is an orthogonal matrix calculated from a singular value decomposition (SVD) of a MIMO channel matrix. In yet another embodiment, the CSI matrix is a covariance matrix of a MIMO channel matrix.

Figure 7:
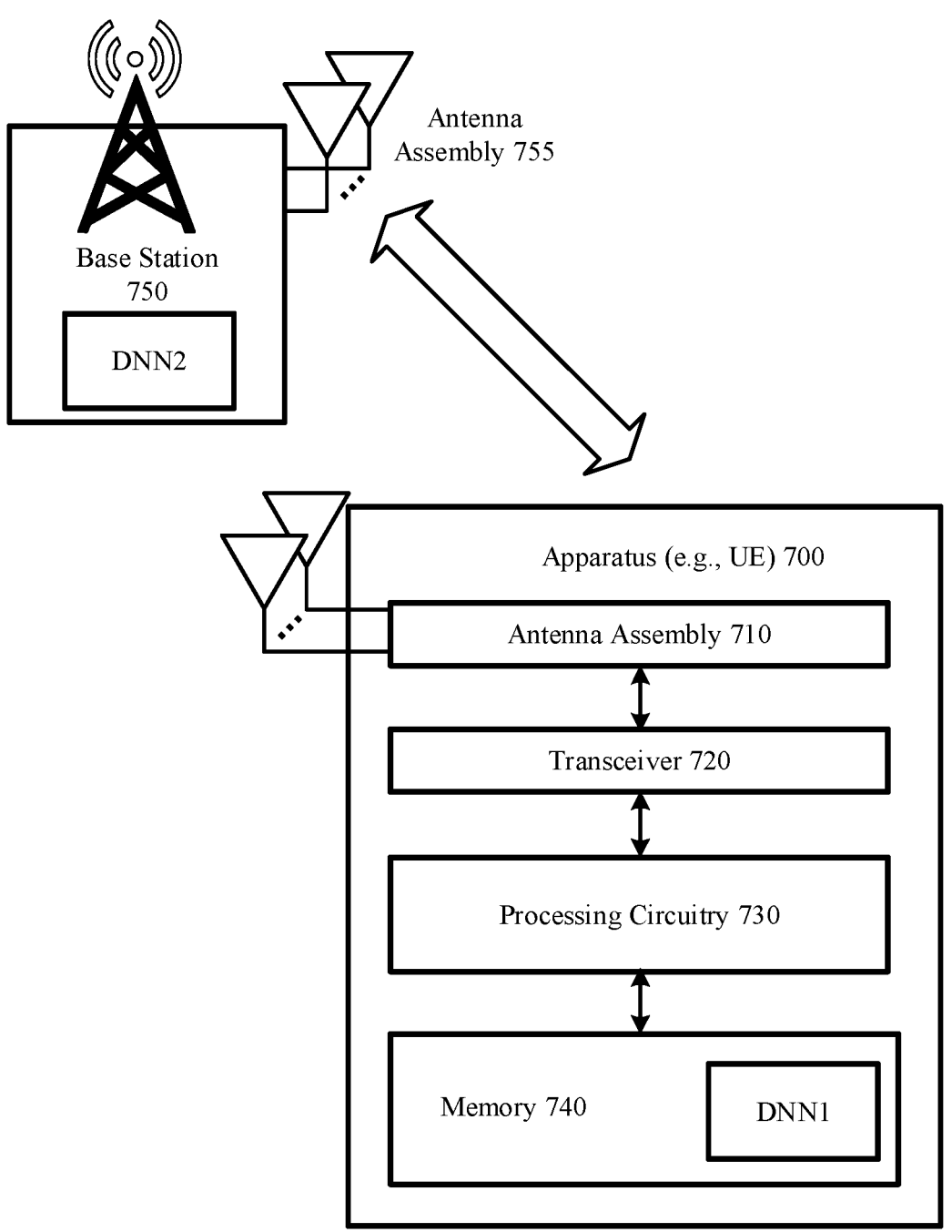
FIG. 7 is a block diagram illustrating an apparatus performing wireless communication with a base station according to one embodiment.

FIG. 7 is a block diagram illustrating an apparatus 700 performing wireless communication with a base station 750 according to one embodiment. In one embodiment, the apparatus 700 may be a UE and the base station 750 may be a gNb or the like. In one embodiment, the apparatus 700 may be the UE 150 in FIGS. 1 and 2, and the base station 750 may be the BS 120 in FIGS. 1 and 2. The base station 750 includes an antenna assemble 755 (e.g., a MIMO antenna array) to form beams for transmitting and receiving signals. The apparatus 700 also includes an antenna assembly 710 (e.g., a MIMO antenna array) to support beamforming operations. The base station 750 includes a memory, in which DNN2 is stored. The apparatus 700 also includes a memory circuit (also referred to as memory 740), in which DNN1 is stored.

Furthermore, the apparatus 700 includes a transceiver circuit (also referred to as a transceiver 720) including a transmitter and a receiver configured to provide radio communications with another station in a radio access network. The transmitter and the receiver may include filters in the digital front end for each cluster, and each filter can be enabled to pass signals and disabled to block signals. The apparatus 700 also includes processing circuitry 730 which may include one or more control processors, signal processors, central processing units, cores, and/or processor cores. coupled to the processing circuitry 730. The apparatus 700 may also include an interface (such as a user interface). The apparatus 700 may be incorporated into a wireless system, a station, a terminal, a device, an appliance, a machine, and IoT operable to perform wireless communication in a multi-access network, such as a 5G NR network.

In one embodiment, both the base station 750 and the apparatus 700 may store and transmit (internally and/or with other electronic devices over a network) code (composed of software instructions) and data using computer-readable media, such as non-transitory tangible computer-readable media (e.g., computer-readable storage media such as magnetic disks; optical disks; read-only memory; flash memory devices) and transitory computer-readable transmission media (e.g., electrical, optical, acoustical or other forms of propagated signals). For example, the memory 740 may include a non-transitory computer-readable storage medium that stores computer-readable program code. The code, when executed by the processors, causes the processors to perform operations according to embodiments disclosed herein, such as the methods disclosed in FIGS. 5 and 6.

Although the apparatus 700 and the base station 750 are used in this disclosure as an example, it is understood that the methodology described herein is applicable to any computing and/or communication device capable of performing wireless communications.

The operations of the flow diagrams of FIGS. 5 and 6 have been described with reference to the exemplary embodiment of FIG. 7. However, it should be understood that the operations of the flow diagrams of FIGS. 5 and 6 can be performed by embodiments of the invention other than the embodiment of FIG. 7, and the embodiment of FIG. 7 can perform operations different than those discussed with reference to the flow diagrams. While the flow diagrams of FIGS. 5 and 6 show a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A method for a user equipment (UE) to report channel state information (CSI) to a base station in multiple-input multiple-output (MIMO) transmissions, comprising:

constructing a CSI matrix based on a CSI reference signal (CSI-RS) received from the base station, wherein the CSI matrix is at least three-dimensional in a transmit (Tx) antenna domain, a frequency domain, and a time domain;

transforming the CSI matrix into a transformed matrix in at least a Tx beam domain, a delay domain, and a Doppler domain;

encoding the transformed CSI matrix into a one-dimensional feature vector using a multi-layered neural network; and sending the one-dimensional feature vector to the base station.

2. The method of claim 1, wherein the CSI matrix further includes a fourth dimension in a receive (Rx) antenna domain which is transformed into an Rx beam domain.

3. The method of claim 2, wherein the Rx antenna domain is indexed by the number of Rx antennas at the UE.

4. The method of claim 1, wherein the time domain is indexed by the number of symbols or slots.

5. The method of claim 1, wherein the frequency domain is indexed by the number of subbands or subcarriers.

6. The method of claim 1, wherein the Tx antenna domain is indexed by the number of Tx antennas at the base station.

7. The method of claim 1, wherein the CSI matrix is a MIMO channel matrix.

8. The method of claim 1, wherein the CSI matrix is an orthogonal matrix calculated from a singular value decomposition (SVD) of a MIMO channel matrix.

9. The method of claim 1, wherein the CSI matrix is a covariance matrix of a MIMO channel matrix.

10. The method of claim 1, wherein the multi-layered neural network includes one or more convolutional neural network layers.

11. A method for a base station to obtain channel state information (CSI) from a user equipment (UE) in multiple-input multiple-output (MIMO) transmissions, comprising:

receiving a one-dimensional feature vector from the UE;

decoding the one-dimensional feature vector into a matrix of at least three-dimensional in a Tx beam domain, a delay domain, and a Doppler domain using a multi-layered neural network;

transforming the matrix into a CSI matrix in at least a Tx antenna domain, a frequency domain, and a time domain; and precoding downlink transmission based on the CSI matrix.

12. The method of claim 11, wherein the CSI matrix further includes a fourth dimension in a receive (Rx) antenna domain which is transformed from an Rx beam domain.

13. The method of claim 12, wherein the Rx antenna domain is indexed by the number of Rx antennas at the UE.

14. The method of claim 11, wherein the time domain is indexed by the number of symbols or slots.

15. The method of claim 11, wherein the frequency domain is indexed by the number of subbands or subcarriers.

16. The method of claim 11, wherein the Tx antenna domain is indexed by the number of Tx antennas at the base station.

17. The method of claim 11, wherein the CSI matrix is a MIMO channel matrix.

18. The method of claim 11, wherein the CSI matrix is an orthogonal matrix calculated from a singular value decomposition (SVD) of a MIMO channel matrix.

19. The method of claim 11, wherein the CSI matrix is a covariance matrix of a MIMO channel matrix.

20. The method of claim 11, wherein the multi-layered neural network includes one or more convolutional neural network layers.

* * * * *